(12) United States Patent
Kim

(10) Patent No.: US 9,260,057 B2
(45) Date of Patent: Feb. 16, 2016

(54) VEHICLE LAMP USING FLUID LENS AND CONTROL METHOD OF THE VEHICLE LAMP

(71) Applicant: SL Corporation, Daegu (KR)

(72) Inventor: Seon Tae Kim, Gyeongsan (KR)

(73) Assignee: SL Corporation, Daegu (KR)

( * ) Notice: Subject to any disclaimer, the term of this patent is extended or adjusted under 35 U.S.C. 154(b) by 94 days.

(21) Appl. No.: 14/158,315

(22) Filed: Jan. 17, 2014

(65) Prior Publication Data

US 2015/0203028 A1 Jul. 23, 2015

(51) Int. Cl.
| | | |
|---|---|---|
| *B60Q 1/26* | (2006.01) | |
| *B60Q 1/50* | (2006.01) | |
| *B60Q 1/44* | (2006.01) | |
| *G02B 3/12* | (2006.01) | |
| *F21S 8/10* | (2006.01) | |

(52) U.S. Cl.
CPC .............. *B60Q 1/444* (2013.01); *F21S 48/2212* (2013.01); *G02B 3/12* (2013.01)

(58) Field of Classification Search
CPC ........ B60Q 1/44; B60Q 1/448; B60Q 1/2603; B60Q 1/22; B60D 1/36
USPC ......... 340/479, 467, 469, 431, 463, 464, 432; 348/745, 148; 362/84, 278, 101, 512, 362/239; 359/666, 665, 620

See application file for complete search history.

(56) References Cited

U.S. PATENT DOCUMENTS

| | | | | |
|---|---|---|---|---|
| 5,150,098 | A * | 9/1992 | Rakow .......................... | 340/479 |
| 8,441,347 | B2 * | 5/2013 | Marlowe et al. .............. | 340/467 |
| 2004/0189458 | A1 * | 9/2004 | Boyer et al. ................... | 340/479 |
| 2006/0056008 | A1 * | 3/2006 | Ito et al. ........................ | 359/296 |
| 2006/0227567 | A1 * | 10/2006 | Voeller et al. ................. | 362/512 |
| 2006/0232396 | A1 * | 10/2006 | Oasem .......................... | 340/479 |
| 2006/0250809 | A1 * | 11/2006 | Strazzanti ..................... | 362/538 |
| 2007/0241357 | A1 * | 10/2007 | Yan ................................ | 257/98 |
| 2007/0241874 | A1 * | 10/2007 | Okpysh et al. ................ | 340/479 |
| 2007/0247724 | A1 * | 10/2007 | Jung ............................. | 359/666 |
| 2007/0272884 | A1 * | 11/2007 | Utida et al. ................... | 250/573 |
| 2008/0094200 | A1 * | 4/2008 | Matsumoto et al. .......... | 340/469 |
| 2008/0111673 | A1 * | 5/2008 | Roberts ........................ | 340/479 |
| 2008/0238639 | A1 * | 10/2008 | Hopkins ....................... | 340/431 |
| 2009/0302197 | A1 * | 12/2009 | Uchino et al. ............ | 250/201.4 |
| 2009/0310224 | A1 * | 12/2009 | Yu et al. ....................... | 359/666 |
| 2010/0117817 | A1 * | 5/2010 | Kranz et al. .................. | 340/463 |
| 2010/0226116 | A1 * | 9/2010 | Brainard ....................... | 362/84 |

(Continued)

FOREIGN PATENT DOCUMENTS

| | | |
|---|---|---|
| JP | 11-066911 A | 3/1999 |
| JP | 2009-054491 A | 3/2009 |

(Continued)

*Primary Examiner* — Hoi Lau
(74) *Attorney, Agent, or Firm* — Mintz Levin Cohn Ferris Glovsky and Popeo, P.C.; Kongsik Kim; Colleen H. Witherell

(57) ABSTRACT

A vehicle lamp using a fluid lens and a control method of the vehicle lamp are provided. The vehicle lamp notifies the driving status of a vehicle to the drivers of following vehicles via a tail lamp. In particular the vehicle lamp includes a light source and a fluid lens that changes a curvature shape of the fluid lens based on an input current and generates a light emission image that corresponds to a driving status of a vehicle to the exterior of the vehicle lamp. Additionally, the input current varies based on the driving status of the vehicle.

24 Claims, 6 Drawing Sheets

STATE OF TRANSMISSION OF LIGHT

(56) References Cited

U.S. PATENT DOCUMENTS

| | | | |
|---|---|---|---|
| 2010/0254021 A1* | 10/2010 | Yoshida et al. | 359/666 |
| 2010/0297589 A1* | 11/2010 | Ruud | 434/21 |
| 2010/0302646 A1* | 12/2010 | Takai et al. | 359/665 |
| 2010/0327766 A1* | 12/2010 | Recker et al. | 315/291 |
| 2011/0043356 A1* | 2/2011 | Marlowe et al. | 340/467 |
| 2011/0157711 A1* | 6/2011 | Tsuji et al. | 359/665 |
| 2012/0063142 A1* | 3/2012 | Cameron et al. | 362/277 |
| 2012/0099205 A1* | 4/2012 | Bae et al. | 359/620 |
| 2012/0113525 A1* | 5/2012 | Kong et al. | 359/665 |
| 2012/0287493 A1* | 11/2012 | Kuhlman et al. | 359/228 |
| 2012/0320585 A1* | 12/2012 | Lin et al. | 362/239 |
| 2013/0163088 A1* | 6/2013 | Kuhlman et al. | 359/630 |
| 2014/0034979 A1* | 2/2014 | Yeh et al. | 257/98 |
| 2014/0036084 A1* | 2/2014 | Lu | 348/148 |
| 2014/0049945 A1* | 2/2014 | Yeh et al. | 362/101 |
| 2014/0049966 A1* | 2/2014 | Liu et al. | 362/278 |
| 2014/0070937 A1* | 3/2014 | Anderson et al. | 340/464 |
| 2014/0354419 A1* | 12/2014 | Frier et al. | 340/432 |
| 2015/0062446 A1* | 3/2015 | Schreiber et al. | 348/745 |

FOREIGN PATENT DOCUMENTS

| | | |
|---|---|---|
| KR | 20-0160015 Y1 | 8/1999 |
| KR | 10-2009-0009465 A | 1/2009 |
| KR | 10-2010-0019034 A | 2/2010 |
| KR | 10-2012-0034596 A | 4/2012 |

* cited by examiner

| CLASSIFICATION | CHANGES IN LENS SHAPE | CHANGES IN LIGHT EMISSION IMAGE |
|---|---|---|
| Phase 1 |  | <br>SURFACE-EMITTED IMAGE |
| Phase 2 |  | <br>SPOT-TYPE DIRECT LIGHT IMAGE |

| CLASSIFICATION | CURRENT CONTROL | LIGHT EMISSION IMAGES |
|---|---|---|
| a |  | ○ ○ ○ |
| b |  | ◯ ◯ ◯ |
| c |  | ◯ ◯ ◯ |

VEHICLE LAMP USING FLUID LENS AND CONTROL METHOD OF THE VEHICLE LAMP

TECHNICAL FIELD

The present invention relates to a vehicle lamp that uses a fluid lens and a control method of the vehicle lamp, and more particularly, to a vehicle lamp using a fluid lens that notifies the driving status of a vehicle to the drivers of following vehicles via a tail lamp, and a control method of the vehicle lamp.

RELATED ART

Most vehicles are generally equipped with tail lamps, which are mounted at the rear of a vehicle for securing the driver's field of vision and notifying the driving status of the vehicle to the drivers of following vehicles (e.g., vehicles traveling behind the vehicle providing the driving status). In particular, a tail lamp includes a brake light, a taillight, a turn signal light, and a backup light. The brake light is turned on whenever the brake is engaged to alert the drivers of following vehicles. The taillight also secures the driver's field of vision, especially while driving at night or during low lighting conditions.

The brake light and the tail light may be incorporated into a single lamp or may be implemented as separate lamps depending on the type of the vehicle. When the brake light and the tail light are incorporated into a single lamp, the brightness of the single lamp may vary based on whether a braking operation is being performed or the operating state of a taillight switch. In general, the brake light may be configured to be brighter than the tail light.

A related-art tail lamp can provide basic information such as whether the brake is engaged or whether the driver is about to turn, but not information for distinguishing various braking operations such as a rapid braking and a slow braking and various acceleration operations such as a rapid acceleration and a slow acceleration. Therefore, the related-art tail lamp has a clear limit in providing sufficient information for the safety of the drivers of following vehicles.

SUMMARY

The present invention provides a vehicle lamp using a fluid lamp that notifies the driving status of a vehicle to the drivers of following vehicles via a tail lamp. However, aspects of the present invention are not restricted to the one set forth herein. The above and other aspects of the present invention will become more apparent to one of ordinary skill in the art to which the present invention pertains by referencing the detailed description of the present invention given below.

According to an aspect of the present invention, a vehicle lamp that uses a fluid lens may include: a light source; and a fluid lens configured to change a curvature shape thereof based on an input current and generate a light emission image that corresponds to a driving status of a vehicle to the exterior of the vehicle lamp, wherein the input current may vary depending on the driving status of the vehicle.

According to another aspect of the present invention, a method of controlling a current based on the driving status of a vehicle may include: detecting the driving status of a vehicle and outputting a sensor signal; analyzing the sensor signal and generating a current control signal based on the results of the analysis; and adjusting an input current to be applied to a fluid lens based on the current control signal, wherein the fluid lens may change a curvature shape thereof based on the input current and generate a light emission image or a light emission region that corresponds to the driving status of the vehicle to the exterior of the vehicle.

According to embodiments, it may be possible to provide basic information such as whether the brake is engaged and whether the driver is about to turn and information that distinguishes various braking operations such as a rapid braking and a slow braking and various acceleration operations such as a rapid acceleration and a slow acceleration, for the drivers of following vehicles.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION

Figure 1A:
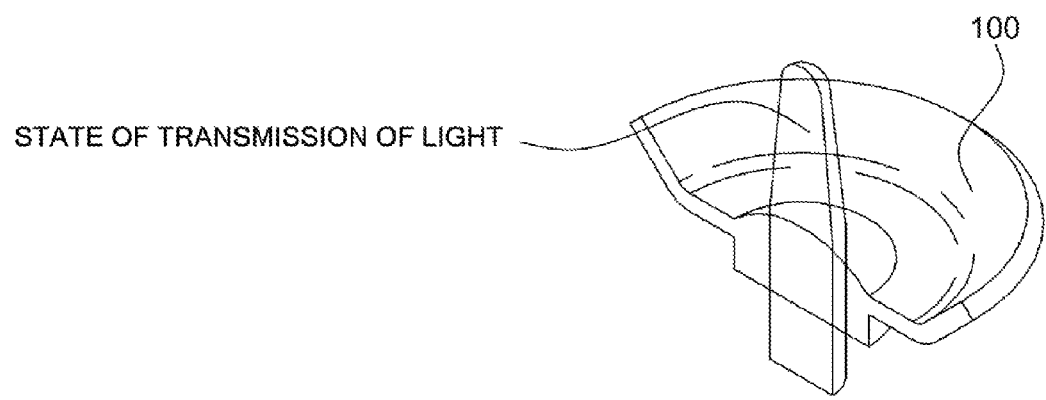
FIGS. 1A-1B are exemplary diagrams illustrating a fluid lens according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the accompanying claims. Like reference numerals refer to like elements throughout the specification. Embodiments will hereinafter be described in detail with reference to the accompanying drawings.

Figure 1B:
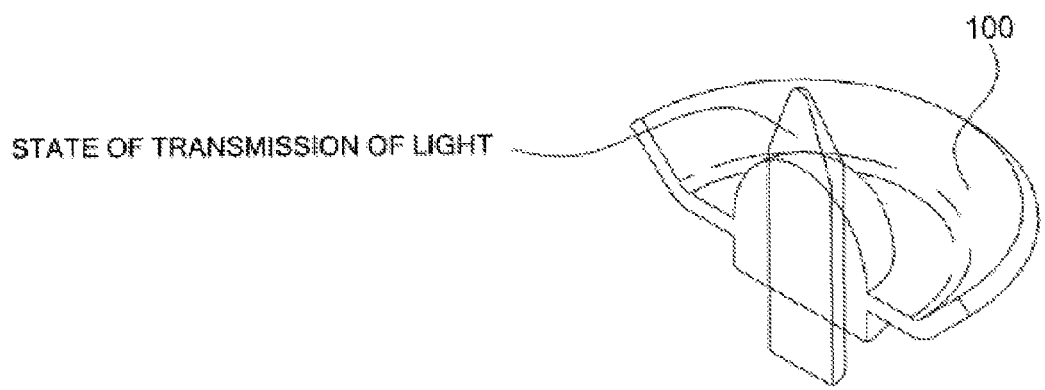
Figure 4:
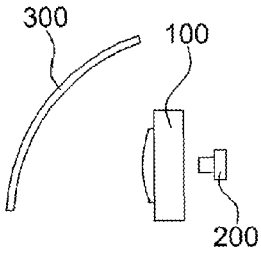
FIG. 4 is an exemplary table showing various light emission images obtained by changing the curvature shape of the fluid lens according to an exemplary embodiment of the present invention.
Figure 4:
Figure 4:
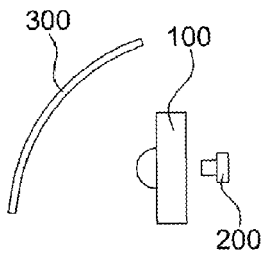
Figure 4:
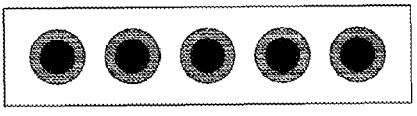

FIGS. 1A-1B are exemplary diagrams illustrating a fluid lens 100 according to an exemplary embodiment. In particular, the fluid lens 100 may be a lens that varies the refraction of light by deforming a fluid. More specifically, referring to FIG. 1A, in response to the curvature of the fluid lens 100 being varied causing the fluid lens 100 to be less convex (lower a curvature shape), light transmitted through the fluid lens 100 may be refracted less sharply based on the varied curvature of the fluid lens 100. In other words, as the curvature of the fluid lens 100 decreases, the refractivity of light transmitted through the fluid lens 100 may also decrease. In response to the curvature of the fluid lens 100 being set to a level that causes minimal refraction of light and maintaining the level before and after the transmission of light through the fluid lens 100, surface-emitted light transmitted through the fluid lens 100 may be emitted toward the exterior of the fluid lens 100, as illustrated in FIG. 4.

Referring to FIG. 1B, in response to the curvature of the fluid lens 100 being varied causing the fluid lens 100 to be more convex (a higher curvature shape), light transmitted through the fluid lens 100 may be refracted sharply based on the varied curvature of the fluid lens 100. In other words, as the curvature of the fluid lens 100 increases, the refractivity of light transmitted through the fluid lens 100 may also increase. Accordingly, light yet to transmit (e.g., not yet transmitted) through the fluid lens 100 may be focused on a substantially narrow spot area, as illustrated in FIG. 4. Therefore, as the curvature of the fluid lens 100 increases, the area of a light emission region where light is emitted toward the exterior of the fluid lens 100 may decrease while the intensity of the light emission region may increase.

Figure 2:
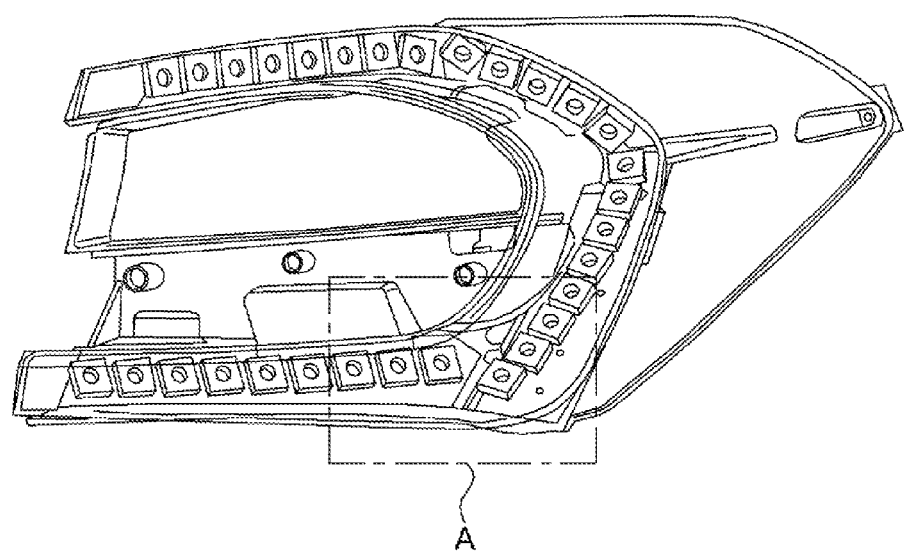
FIG. 2 is an exemplary diagram illustrating a vehicle lamp using the fluid lens, according to an exemplary embodiment of the present invention.
Figure 3:
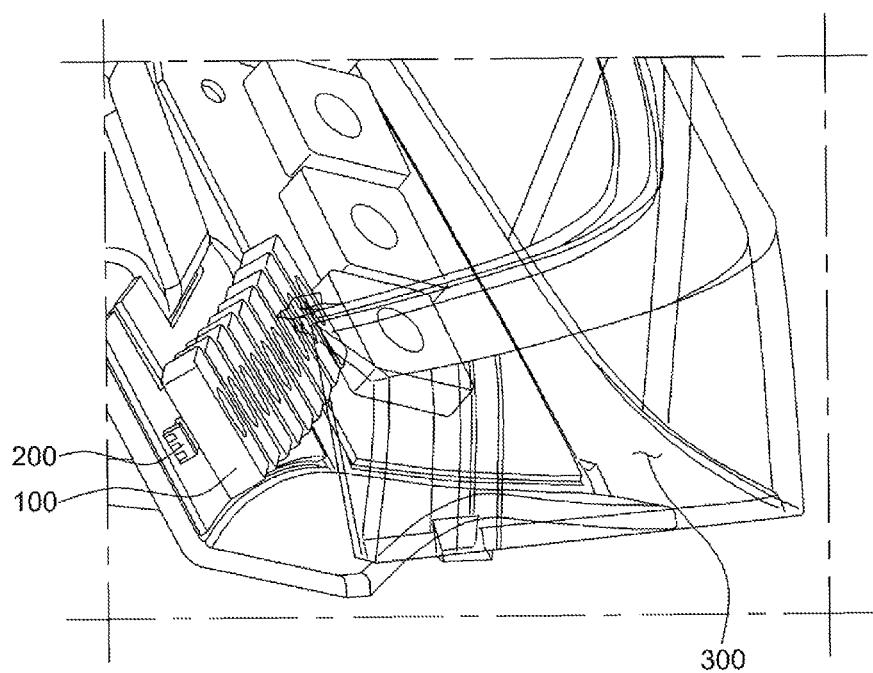
FIG. 3 is an exemplary enlarged view of portion A of FIG. 2 according to an exemplary embodiment of the present invention.

FIG. 2 is an exemplary diagram illustrating a vehicle lamp using the fluid lens 100, according to an exemplary embodiment. Referring to FIG. 2, the fluid lens 100 may be applied to a tail lamp, which will hereinafter be described in detail with reference to FIG. 3. FIG. 3 is an exemplary enlarged view of portion A of FIG. 2. Referring to FIG. 3, the tail lamp may include a light source 200, which may be configured to generate light, the fluid lens 100, which may be configured to adjust the refraction of light transmitted therethrough, and an inner lens 300, via which light transmitted through the fluid lens 100 may be emitted toward the exterior of the tail lamp.

The shape of the fluid lens 100 may be determined by an input current applied to the fluid lens 100. The fluid lens 100 may maintain a shape with a default lens curvature until the input current is applied thereto. In response to an input current being applied to the fluid lens 100, the default lens curvature may be changed to a lower curvature or a higher curvature based on the result of comparing the applied input current with at least one current corresponding to the default lens curvature. In some embodiments, for example, there may be one predetermined current to be compared with the input current. In some other emvodiments, for example, there may be two or more predetermined currents to be compared with the input current. The default lens curvature shape may be set appropriately.

The input current may be determined based on various vehicle-related factors, for example, factors associated with a braking operation (e.g., a rapid or slow braking) and an acceleration operation (e.g., a rapid or slow acceleration). When input current is determined by the braking-related factor, a switch that performs switching based on the degree of braking may be used. More specifically, the degree of braking may be classified as a rapid braking or a substantially slow braking. In response to detecting a rapid braking, the switch may perform a switching operation that corresponds to the rapid braking, and may output a switch output signal that corresponds to the rapid braking.

The switch output signal may be provided to a power supply (not illustrated) that may be configured to apply the input current to the fluid lens 100. The power supply may adjust the level of a current to be applied to the fluid lens 100 based on the switch output signal. In an example, during rapid braking, the power supply may be configured to set the input current to a first level, which may be substantially low, to increase a light emission region where light transmitted through the fluid lens 100 is emitted toward the exterior of the tail lamp. In another example, during rapid braking, the power supply may be configured to vary the level of the input current from the first level to a fifth level, which may be substantially high (e.g., the input current may increase with the increase of each level), in a predetermined pattern. In particular, in response to receiving a switch output signal that corresponds to the rapid braking from the switch, the power supply may be configured to set the input current to the first level rapidly within a predefined amount of time to alert the drivers of following vehicles as soon as possible to the rapid braking.

Further, the luminous intensity of the light source 200 may be adjusted based on a switch output signal output by the switch. In particular, a reduction in luminous intensity resulting from the transformation of the fluid lens 100 into a lower curvature shape and the enlargement of a light emission region during a rapid braking in response to the application of the input current with the first level may be compensated for. In other words, during rapid braking, a current with the fifth level may be applied to the light source 200 such that the luminous intensity of the light source 200 may be substantially uniformly maintained, even when the fluid lens 100 is transformed into a lower curvature shape and as a result, a light emission region where light is emitted toward the exterior of the tail lamp may be enlarged.

To determine the input current based on the braking-related factor, a sensor (not illustrated), may be configured to detect a level of braking and output a sensor signal that corresponds to the detected braking level, and a controller may be configured to receive and analyze the sensor signal and may be configured to operate the power supply based on the results of the analysis. More specifically, during rapid braking, the sensor may be configured to output a sensor signal that corresponds to the rapid braking.

The sensor signal may be transmitted to the controller. The controller may be configured to apply the sensor signal to a signal determination table and identify that the sensor signal is associated with a rapid braking. The controller may be configured to set the input current to the first level, which may be a lowest level, and provide the input current to the power supply. The power supply may be configured to apply the input current set by the controller, to the fluid lens 100 to increase a light emission region where light transmitted through the fluid lens 100 is emitted toward the exterior of the tail lamp.

In an example, during rapid braking, the controller may be configured to vary the level of the input current from the first level to a fifth level, which may be a highest level, in stages. In this example, in response to determining that the sensor signal is associated with rapid braking, the controller may be configured to set the input current to the first level rapidly within a predefined amount of time to alert the drivers of following vehicles to the rapid braking. In another example, the luminous intensity of the light source 200 may be adjusted based on a current control signal output by the controller. In this example, a reduction in luminous intensity resulting from the transformation of the fluid lens 100 into a lower curvature shape and the enlargement of a light emission region during a rapid braking in response to the application of the input current with the first level may be compensated for.

In other words, during rapid braking, a current with the fifth level may be applied to the light source 200 to maintain the luminous intensity of the light source 200 substantially uniformly, even when the fluid lens 100 is transformed into a lower curvature shape and as a result, a light emission region where light is emitted toward the exterior of the tail lamp may be enlarged. When the tail lamp using the fluid lens 100 is provided with a light detection sensor, the tail lamp may be adjusted in a predetermined pattern in response to the occurrence of an event such as a rapid braking even in a dark area such as a tunnel.

Figure 5:
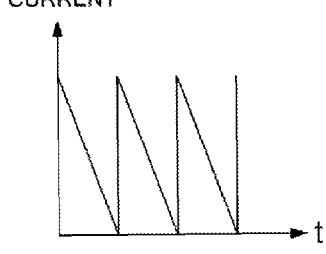
FIG. 5 is an exemplary table showing various light emission images obtained by controlling an input current applied to the vehicle lamp according to an exemplary embodiment of the present invention.
Figure 5:
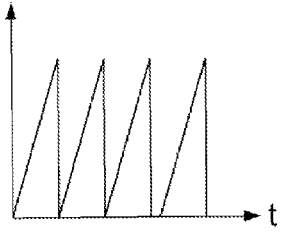
Figure 5:
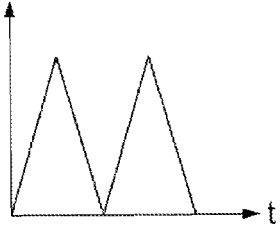

FIG. 5 is a table showing an example of various light emission images obtained by controlling an input current applied to the vehicle lamp using the fluid lens 100. Referring to FIG. 5, a light emission region or a light emission image may be varied or generated in a predetermined pattern by adjusting an input current applied to the vehicle lamp using the fluid lens 100 in various manners. More specifically, during a rapid acceleration, as high an input current as possible (e.g., a highest input current) may be applied to the vehicle lamp using the fluid lens 100 rapidly within a predefined amount of time, to focus light transmitted through the fluid lens 100 on a spot-shaped narrow region, as indicated by reference character a of FIG. 5. Alternatively, during a rapid acceleration, the input current may be set to a fifth level, which may be a highest level, rapidly within a predefined amount of time and may then be reduced from the fifth level to a first level, which may be substantially low, in a predetermined pattern.

Reference character b of FIG. 5 indicates how to control the input current during a rapid braking. The control of the input current during a rapid braking has already been described above, and thus, a detailed description thereof will be omitted. Reference character c of FIG. 5 indicates how to control the input current when a vehicle is being stopped or being driven at a substantially low speed of about 10 Km/h or less. In particular, the input current may be set to the first level and may then be gradually increased from the first level to the fifth level in a predetermined pattern. In response to the input current reaching the fifth level, the input current may be reset to the first level.

The vehicle lamp using the fluid lens 100 is not limited to the examples or embodiments set forth herein. The vehicle lamp using the fluid lens 100 may provide the drivers of following vehicles with various information, other than those set forth herein, by appropriately adjusting the shape and pattern of a light emission region. The present inventive concept, which relates to notifying the driving status of a vehicle to the drivers of following vehicles via a tail lamp, has the potential to be commercialized and marketed, and may be enabled. Accordingly, the present inventive concept should be regarded as having industrial applicability.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A vehicle lamp using a fluid lens, comprising:
a light source;
a fluid lens configured to receive an input current, change a curvature shape of the fluid lens based on the input current, and generate a light emission image that corresponds to a driving status of a vehicle to the exterior of the vehicle lamp;
a switch configured to detect the driving status of the vehicle and output a switch output signal; and
a power supply configured to adjust the input current based on the switch output signal,
wherein the input current varies based on the driving status of the vehicle.

2. The vehicle lamp of claim 1, wherein the fluid lens is further configured to change the curvature shape of the fluid lens into a lower curvature shape in response to the input current being lower than a predetermined threshold.

3. The vehicle lamp of claim 2, wherein a first predetermined threshold for the input current for changing the curvature shape of the fluid lens into the lower curvature shape is set in advance.

4. The vehicle lamp of claim 1, wherein the fluid lens is further configured to change the curvature shape of the fluid lens into a higher curvature shape in response to the input current being greater than the predetermined threshold.

5. The vehicle lamp of claim 4, wherein a second predetermined threshold for the input current for changing the curvature shape of the fluid lens into the higher curvature shape is set in advance.

6. The vehicle lamp of claim 1, wherein the input current is determined based on one or more vehicle-related factors that indicate the driving status of the vehicle, the vehicle-related factors including a breaking operation, a stopping operation, an acceleration operation, or any combination thereof.

7. The vehicle lamp of claim 1, wherein the power supply is further configured to set the input current to a level that corresponds to the driving status of the vehicle.

8. The vehicle lamp of claim 1, wherein the power supply is further configured to set the input current to vary between one or more levels in a predetermined pattern.

9. The vehicle lamp of claim 1, wherein the power supply is further configured to adjust a current to be applied to the light source in response to receiving the switch output signal.

10. The vehicle lamp of claim 9, wherein the power supply is further configured to set the current to be applied to the light source to an inverted level of the input current.

11. A vehicle lamp using a fluid lens, comprising:
   a light source;
   a fluid lens configured to receive an input current, change a curvature shape of the fluid lens based on the input current, and generate a light emission image that corresponds to a driving status of a vehicle to the exterior of the vehicle lamp;
   a sensor configured to detect the driving status of the vehicle and output a sensor signal;
   a controller configured to analyze the sensor signal and generate a current control signal based on results of the analysis; and
   a power supply configured to adjust the input current based on the current control signal,
   wherein the input current varies based on the driving status of the vehicle.

12. The vehicle lamp of claim 11, wherein the controller is further configured to generate the current control signal to set the input current based on a switch output signal.

13. The vehicle lamp of claim 11, wherein the controller is further configured to generate the current control signal to set the input current to vary between one or more levels in a predetermined pattern.

14. The vehicle lamp of claim 11, wherein the controller is further configured to adjust a current to be applied to the light source in response to receiving the sensor signal.

15. The vehicle lamp of claim 14, wherein the controller is further configured to set the current to be applied to the light source to an inverted level of the input current.

16. A method of controlling a current based on a driving status of a vehicle, the method comprising:
   detecting, by a sensor, the driving status of a vehicle;
   outputting, by the sensor, a sensor signal;
   analyzing, by a controller, the sensor signal;
   generating, by the controller, a current control signal based on results of the analysis;
   adjusting, by the controller, an input current to be applied to a fluid lens based on the current control signal,
   wherein the fluid lens changes a curvature shape of the fluid lens based on the input current and generates a light emission image or a light emission region that corresponds to the driving status of the vehicle to the exterior of the vehicle; and
   generating, by the controller, the light emission image or the light emission region in the shape of a narrow spot by applying a highest input current to the fluid lens within a predefined amount of time in response to the results of the analysis that indicate that the vehicle is in a rapid acceleration mode.

17. The vehicle lamp of claim 11, wherein the fluid lens is further configured to change the curvature shape of the fluid lens into a lower curvature shape in response to the input current being lower than a predetermined threshold.

18. The vehicle lamp of claim 17, wherein a first predetermined threshold for the input current for changing the curvature shape of the fluid lens into the lower curvature shape is set in advance.

19. The vehicle lamp of claim 11, wherein the fluid lens is further configured to change the curvature shape of the fluid lens into a higher curvature shape in response to the input current being greater than the predetermined threshold.

20. The vehicle lamp of claim 19, wherein a second predetermined threshold for the input current for changing the curvature shape of the fluid lens into the higher curvature shape is set in advance.

21. The vehicle lamp of claim 11, wherein the input current is determined based on one or more vehicle-related factors that indicate the driving status of the vehicle, the vehicle-related factors including a breaking operation, a stopping operation, an acceleration operation, or any combination thereof.

22. A method of controlling a current based on a driving status of a vehicle, the method comprising:
   detecting, by a sensor, the driving status of a vehicle;
   outputting, by the sensor, a sensor signal;
   analyzing, by a controller, the sensor signal;
   generating, by the controller, a current control signal based on results of the analysis;
   adjusting, by the controller, an input current to be applied to a fluid lens based on the current control signal,
   wherein the fluid lens changes a curvature shape of the fluid lens based on the input current and generates a light emission image or a light emission region that corresponds to the driving status of the vehicle to the exterior of the vehicle; and,
   adjusting, by the controller the input current to sequentially vary from a highest level to a lowest level in a predetermined pattern within a predefined amount of time in response to the results of the analysis that indicate that the vehicle is in a rapid acceleration mode.

23. A method of controlling a current based on a driving status of a vehicle, the method comprising:
   detecting, by a sensor, the driving status of a vehicle;
   outputting, by the sensor, a sensor signal;
   analyzing, by a controller, the sensor signal;
   generating, by the controller, a current control signal based on results of the analysis;
   adjusting, by the controller, an input current to be applied to a fluid lens based on the current control signal,
   wherein the fluid lens changes a curvature shape of the fluid lens based on the input current and generates a light emission image or a light emission region that corresponds to the driving status of the vehicle to the exterior of the vehicle; and
   generating, by the controller, the light emission image or the light emission region in a circular shape with a predetermined size by applying a lowest input current to the fluid lens within a predefined amount of time in response to the results of the analysis that indicate that the vehicle is in a rapid braking mode.

24. A method of controlling a current based on a driving status of a vehicle, the method comprising:
   detecting, by a sensor, the driving status of a vehicle;
   outputting, by the sensor, a sensor signal;
   analyzing, by a controller, the sensor signal;
   generating, by the controller, a current control signal based on results of the analysis;
   adjusting, by the controller, an input current to be applied to a fluid lens based on the current control signal, wherein the fluid lens changes a curvature shape of the fluid lens based on the input current and generates a light emission image or a light emission region that corresponds to the driving status of the vehicle to the exterior of the vehicle; and adjusting, by the controller, the input current to sequentially vary from a lowest level to a highest level in a predetermined pattern within a predefined amount of time in response to the results of the analysis that indicate that the vehicle is in a quick braking mode.

* * * * *